United States Patent
Wen-Hwang

Patent Number: 5,215,348
Date of Patent: Jun. 1, 1993

[54] STRUCTURE FOR A FOOT PAD IN AN AUTOMOBILE RUG

[75] Inventor: Yang Wen-Hwang, Taipei, Taiwan

[73] Assignee: Formosa Saint Jose Corporation, Taipei, Taiwan

[21] Appl. No.: 927,014

[22] Filed: Aug. 10, 1992

[30] Foreign Application Priority Data

Mar. 13, 1991 [MY] Malaysia ............................. 9200406

[51] Int. Cl.⁵ .............................................. B60N 3/04
[52] U.S. Cl. ..................................... 296/97.23; 15/215
[58] Field of Search ..................... 296/97.23; 15/215; 428/88, 98, 101

[56] References Cited

U.S. PATENT DOCUMENTS

| | | | |
|---|---|---|---|
| 2,810,672 | 10/1957 | Taylor | 296/97.23 X |
| 3,605,166 | 9/1971 | Chen | 15/215 |
| 4,673,603 | 6/1987 | Roth | 428/85 |
| 4,751,764 | 6/1988 | Reuben | 296/97.23 X |

Primary Examiner—Robert R. Song
Attorney, Agent, or Firm—Young & Forward

[57] ABSTRACT

A foot pad structure on a rug in an automobile, of which the prime features are that the part to be pedalled on the foot pad has rectangular hole, and a base plate being fixed under the rectangular hole; the base plate has several slots arranged in parallel, in which a corresponding number of Velcro strips or two-side adhesive tapes are to be mounted. There is a detachable pedal piece, of which the front side is to be pedalled by a driver, while the back side thereof is fixedly attached with a plurality of Velcro strips corresponding in number and position to the slots in the aforesaid base plate; by means of such a structure, the pedal piece can directly be fastened together as one piece with the base plate of the foot pad in an automobile. Whenever the pedal piece becomes worn and torn, it can be replaced with a new one without replacing the whole foot pad at a higher cost so as to improve the drawbacks of the conventional foot pad.

1 Claim, 4 Drawing Sheets

/ 1

STRUCTURE FOR A FOOT PAD IN AN AUTOMOBILE RUG

BACKGROUND OF THE INVENTION

Automobile (or car) has become an indispensable transportation means at the present time; automobile industry and the satellite industry thereof have highly been developed in all developed countries. Varous models of cars with different features have also been designed and manufactured to meet the market demand; therefore, all the car manufactures lose no time to research and develop new cars; however, a perfect car not only has excellent functions and outer model, but it also should have a complete set of accessories and inner decorations to show the prominent features of a deluxe car; therefore, the inner accessories of a car are much important to the same.

According to the present invention, the rug in a car is to be stepped over by a driver or riders, and to provide a decorative function for a car; consequently, the rug has become an indispensable accessory. A car owner usually adds a set of foot pads (i.e., four pieces of foot pads with a given pattern and color, which are on sale by a whole set) so as to protect the rug in a car. It is well-known that a set of foot pads has a small part which is susceptible to wear-and-tear; that small part is so called the "pedalled part"; the pedalled part according to the present invention is a small part which is usually stepped over by a driver's two feet. When a driver steps on the accelerator, the clutch on the brake pedal with force, his (or her) shoe heel would first be put on the pedalled part of the foot ped; the pedalling force of the shoe heel is similar to a vertical impact to be applied to the foot pad, i.e., it is not a paralled rubbing force. After a long period of time of such vertical impact, the pedalled part will be broken with a through hole, and it would become useless (it is particularly true to a female driver who usually wears high heel shoes); as a result, the foot pad has to be replaced quite after, though the particular piece of foot pads with the same pattern and color might not be available. Usually, the supplier of such foot pads would recommend a car owner to replace the whole set of foot pads (i.e., four pieces), and it would cost the car owner to spend more money just because of that small part broken, aside from inconvenience to the owner. If the broken foot pad is not replaced with a new piece, the whole car looks like an imperfect one, and the rug under the foot pad would be damaged soon in addition to an abnormal or strange pedalling feeling to the driver.

In view of the aforesaid drawbacks of the foot pads, the manufacturer has developed an improved foot pad as shown in FIG. 1, in which a pedal piece made of plastic material is attached to the pedalled part of the foot pad for preventing the pedalled part from impact and tear at least for a given period of time; however, as soon as the pedal piece is broken the rug in the car will be damaged soon (as indicated witch P in FIG. 6); in that case, the rug and the whole set of foot pad in a car have to be replaced at a considerable amount of money because of the broken "pedalled part" unable to be replaced; in other words, the aforesaid improved foot pad set is unable to solve the problem of the vulnerable foot pad. Moreover, the aforesaid foot pad made of plastics is harmful to a shoe heel because both of them being made of rigid materials, i.e., plastics being deemed not a good material for making foot pad.

In view of the aforesaid drawbacks of that foot pad, the inventor has developed an improved structure of the foot pad which is to be attached to a rug in a car. According to the present invention, the drawbacks of the conventional foot pad can be eliminated, and such a foot pad can provide a car with a practial function.

SUMMARY OF THE INVENTION

The feature of the present invention is that the pedalled part of a foot pad has a through rectangular hole, under which a base plate is fixed attached; a pedal piece is to be fastened together with the base plate. The base plate has several slots arranged in parallel one another, in which a corresponding number of Velcro strips (hook surface or pile surface) or two-side adhesive tapes are mounted. Moreover, a pedal piece is fastened, in a detachable manner, on the aforesaid base plate; the front side of the pedal piece is to be stepped over by a driver, while the back side thereof is furnished with several Velcro strips (pile surface or hook surface) arranged in parallel one another, and corresponding in position to the slots in the aforesaid base plate; then, the pedal piece and the foot pad can directly be fastened together as one piece. Whenever the pedal piece is broken as a result of wear and tear, it can easily he replaced with a new one without spending much money to replace the whole set of foot pads.

DETAILED DESCRIPTION

Figure 1:
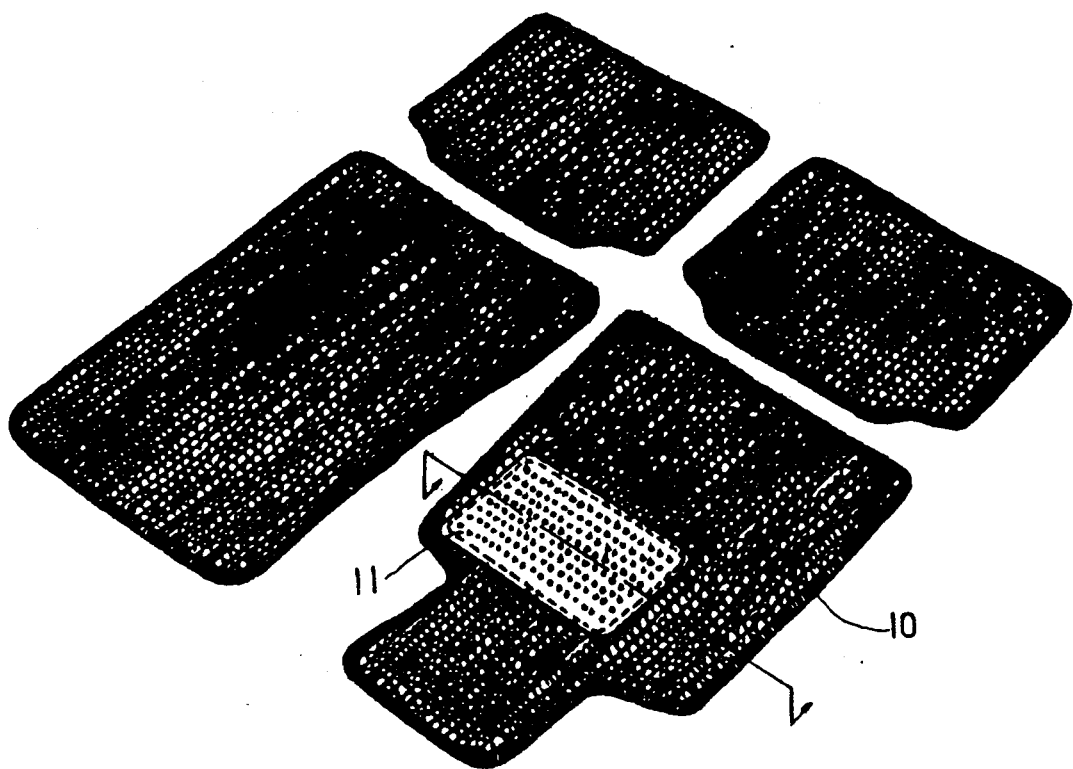
FIG. 1 is a perspective view of a set of conventional foot pad for an automabile (or car).
Figure 2:
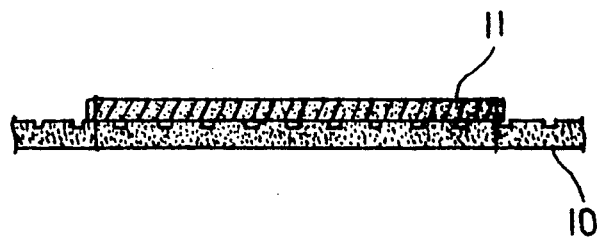
FIG. 2 is a sectional view of the conventional foot pad.

FIGS. 1 and 2 show the structure of a conventional foot pad (10) for a car (This invention is described with a foot pad which is to be mounted in front of a driver's seat). The foot pad is usually made of a high value material. In order to increase the serviceable life of the foot pad, the manufacturer usually mounts a pedal piece (11) made of hard or plastic material above a small area on the foot pad, where is susceptible to wear and tear as a result of pedalling of driver's foot; however, the material of such pedal piece (11) is not fit in color and pedalling feeling to the foot pad and the rug in a car; moreover, after being used for a given period of time, the pedal piece (11) is subject to becoming broken by the shoe heel of driver, and the car owner or the manufacturer would not repair or replace the broken pedal piece (11); in other words, the car owner has to buy a new set (four pieces) of conventional foot pad (10) with additional cost. It is deemed economical.

Figure 3:
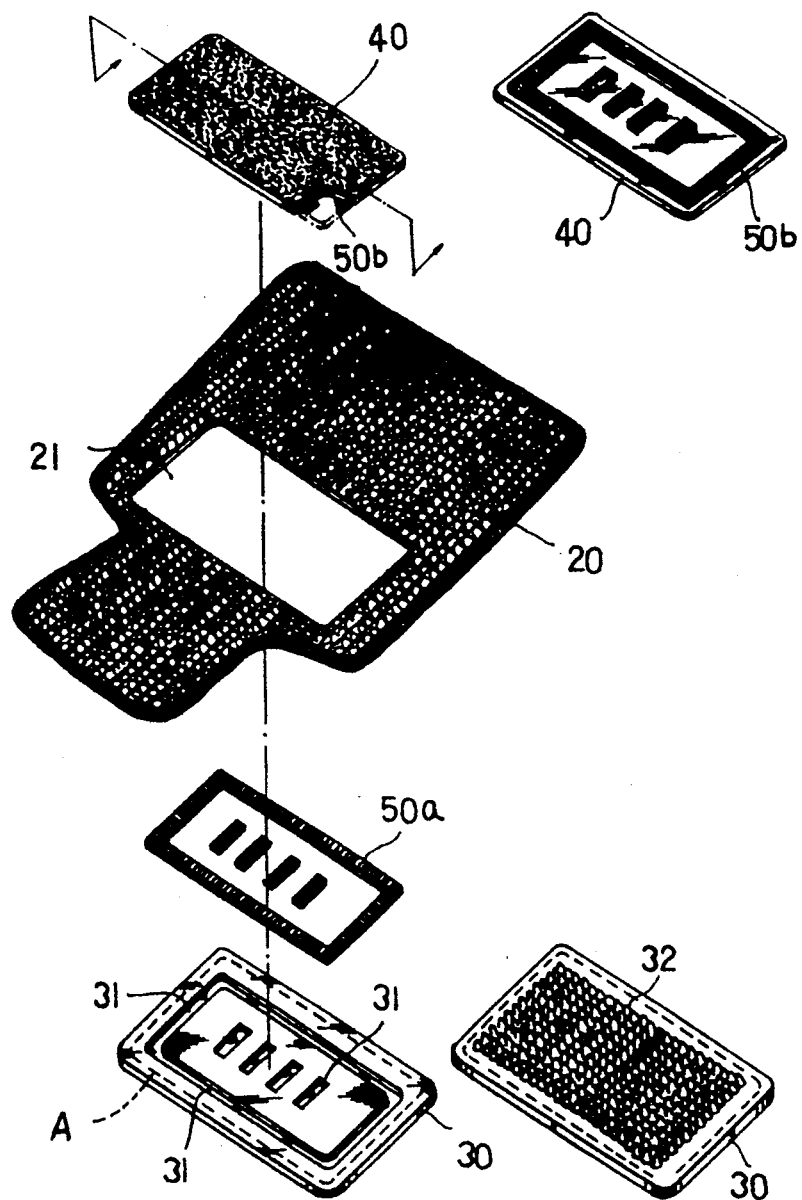
FIG. 3 is a disassembled view of an embodiment of a foot pad according to the present invention.
Figure 4:
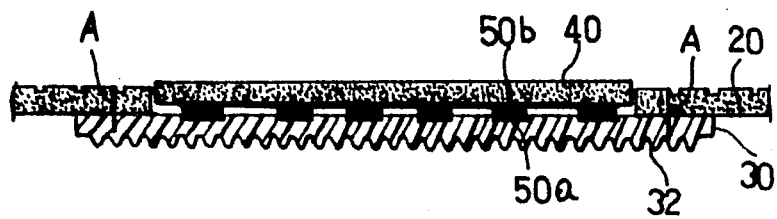
FIG. 4 is a sectional view of the foot pad according to the present invention.

Referring to FIGS. 3 and 4, the present invention comprises a foot pad (20), a base plate (30), and a pedal piece (40). The front part of the foot pad (20) has a rectangular hole (21) which is usually the part to be pedalled by driver's foot. The base plate (30) is slightly larger than the size of the rectangular hole (21); the base plate (30) is to be fitted in place along the edge of the rectangular hole (21) by means of sewing method "A" so as to have the foot pad (20) and the base plate fixed together.

As shown in FIG. 3, the base plate (30) is substantially a flat piece, of which the front side has several slots (31) arranged in parallel for receiving a corresponding number of Velcro strips (50a) (a hook surface or a pile surface); the strips (50a) are to fasten together with Velcro strips (50b) (a pile surface or a hook surface) on the back side of a pedal piece (40). The back side of the base plate (30) is provided with a plurality of slip-resistant beads (32), whereby the base plate (30) can be adhered together with the car rug under the foot pad (20) so as to prevent the foot pad (20) from slipping on the car rug.

As shown in FIG. 3, the size of the pedal piece (40) is exactly fit to the rectangular hole (21) of the foot pad (20), i.e., to fill the space of the rectangular hole to have the pedal piece and the foot pad become one single piece. The front side of the pedal piece (40) is planted with a brush-type elastic pile surface in the same color and pattern same as those of the foot pad (20); such a pile surface can prevent a driver's shoe heel from being wear and tear. The back side of the pedal piece (40) is furnished with several Velcro strips (50b) (a pile surface or a hook surface) corresponding to those Velcro strips (50a) (a hook surface or a pile surface) in the slots (31) of the base plate; after the pedal piece is put above the base plate (30), both the pedal piece and the base plate (30) will be fastened together by means of the Velcro strips (50a) and (50b); in that case, the pedal piece (40) and the foot pad (20) will become one single piece.

Figure 5:
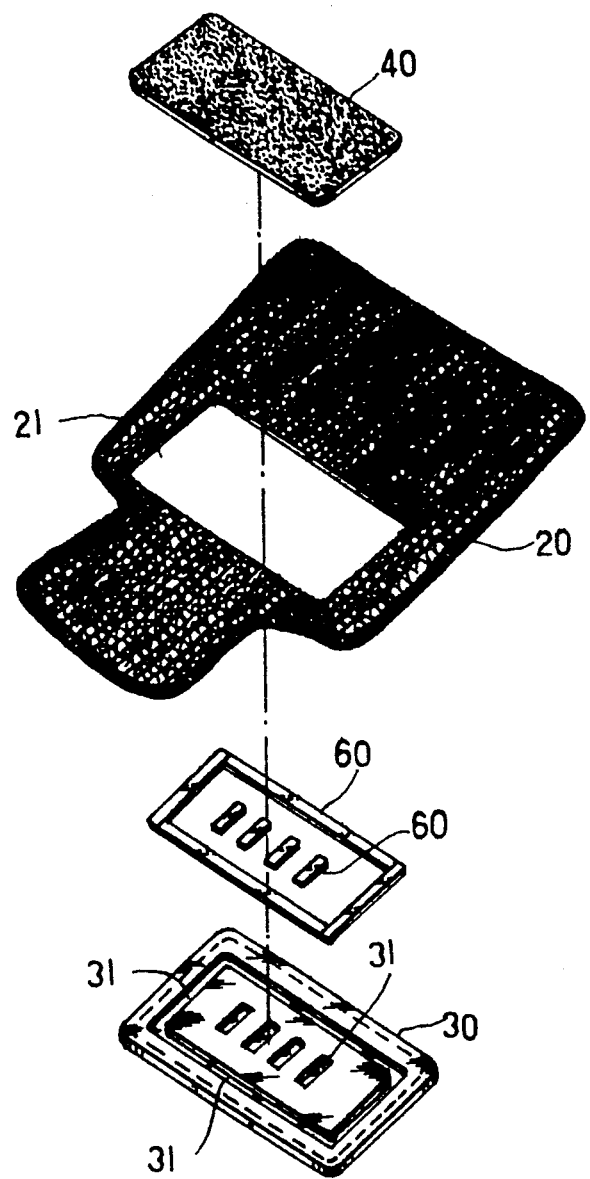
FIG. 5 is a disassembled view of another embadiment according to the present invention.
Figure 6:
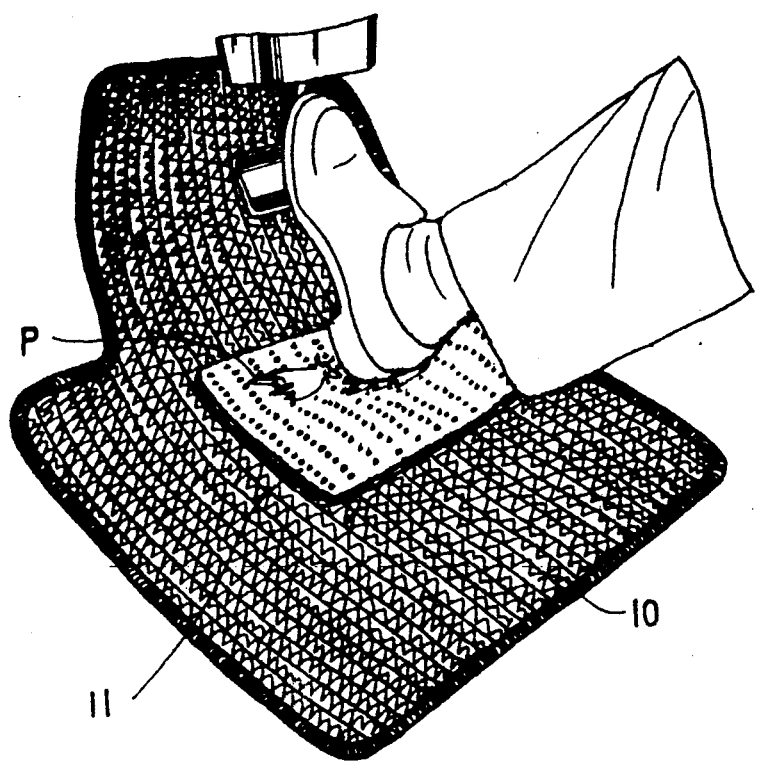
FIG. 6 is a perspective view of showing the wear-and-tear condition of a conventional foot pad in a car.

FIG. 5 illustrates another embadiment according to the present invention, in which the slots (31) in the base plate (30) are filled with a two-side adhesive tape (60), whereby the base plate (30) and the pedal piece (40) are glued together directly; the aforesaid gluing method can provide the same fastening result as that of the Velcro strips.

In brief, since the pedal piece (40) of the present invention is made of a brush-type elastic pile, it would not harm the shoe heel. The pattern and color of the pedal piece may be varied, i.e., being not limited to that of the foot pad. Whenever the pedal piece becomes worn and torn, it can easily be removed from the base plate to replace it with a new one; in other words, the present invention is deemed much convenient to a user in comparison with the conventional foot pad, and saving an amount of money to replace a whole piece or set of the foot pad. It is apparent that the present invention is practical without having the drawbacks of the conventional foot pad, aside from the simple and novel features thereof.

I claim:

1. An improved structure for a foot pad in an automobile rug comprising:
   a foot pad, of which the front part has a rectangular hole;
   a base plate being sewn to said foot pad, and front side of said base plate being provided with several slots arranged in parallel one another for receiving a given number of Velcro strips or two-side adhesive tapes; and back side of said base plate being provided with a plurality of slip-resistant beads;
   a pedal piece having a size to be fitted in said rectangular hole; and front side of said pedal piece being planted with a brush-type elastic pile, while back side of said pedal piece being provided with several Velcro strips which one corresponding in number and position to said Velcro strips in said slots, and by means of said Velcro strips, said pedal piece and said base plate able to be fastened into a one single piece; and
   whenever said pedal piece being used for a given period of time to become worn and torn, a new one can be put in place simply to replace the old one so as to improve drawbacks of the conventional foot pad.

* * * * *